United States Patent
Park et al.

(10) Patent No.: US 7,539,415 B2
(45) Date of Patent: May 26, 2009

(54) OPTICAL PACKET COMMUNICATION SYSTEM USING LABELING OF WAVELENGTH-OFFSET POLARIZATION-DIVISION MULTIPLEXING

(75) Inventors: Keun-joo Park, Yongin-si (KR); Hyun-chin Kim, Seoul (KR); June-koo Rhee, Seongnam-si (KR); Young-kwang Seo, Seoul (KR); Chun-ju Youn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 11/264,030

(22) Filed: Nov. 2, 2005

(65) Prior Publication Data

US 2006/0093358 A1 May 4, 2006

(30) Foreign Application Priority Data

Nov. 2, 2004 (KR) ..................... 10-2004-0088348

(51) Int. Cl.
*H04J 14/06* (2006.01)
*H04J 14/00* (2006.01)
*H04J 4/00* (2006.01)

(52) U.S. Cl. .............................. 398/65; 398/51; 398/57; 398/74

(58) Field of Classification Search ................... 398/51, 398/57, 65, 74

See application file for complete search history.

(56) References Cited

U.S. PATENT DOCUMENTS

| | | | | |
|---|---|---|---|---|
| 5,900,957 | A * | 5/1999 | Van Der Tol | 398/54 |
| 6,748,134 | B2 * | 6/2004 | Bigo et al. | 385/24 |
| 2001/0017866 | A1 * | 8/2001 | Takada et al. | 370/535 |
| 2004/0033074 | A1 * | 2/2004 | Hsu | 398/51 |
| 2006/0159454 | A1 * | 7/2006 | Bjornstad | 398/51 |
| 2008/0019692 | A1 * | 1/2008 | Fischler et al. | 398/50 |

FOREIGN PATENT DOCUMENTS

| | | |
|---|---|---|
| JP | 06216850 A | 8/1994 |
| JP | 11068702 A | 3/1999 |
| JP | 2003110504 A | 4/2003 |

* cited by examiner

*Primary Examiner*—Nathan M Curs
(74) *Attorney, Agent, or Firm*—Sughrue Mion, PLLC

(57) ABSTRACT

Disclosed is an optical packet communication system using a wavelength-offset polarization-division multiplexing labeling. An optical signal transmitter which is provided at an ingress node positioned at a sending end in an optical packet switching network, generates and combines packet data and a label, and transmits the combined packet data and label to a core node, wherein the packet data and label have polarization directions perpendicular to each other and maintain a predetermined wavelength interval. A label swapping device detects the label from the combined packet data and label received from the optical signal transmitter, detects next moving position information of the packet data, for generating a new label, substitutes the detected label by the new label, combines the new label with the packet data, and transmits the combined packet data and new label to a next moving position.

4 Claims, 5 Drawing Sheets

US 7,539,415 B2

OPTICAL PACKET COMMUNICATION SYSTEM USING LABELING OF WAVELENGTH-OFFSET POLARIZATION-DIVISION MULTIPLEXING

CROSS-REFERENCE TO RELATED APPLICATIONS

The application claims benefit under 35 U.S.C. § 119 from Korean Patent Application No. 2004-88348, filed on Nov. 2, 2004, the entire content of which is incorporated herein by reference.

BACKGROUND OF THE INVENTION

1. Field of the Invention

The present invention relates to an optical packet communication system using a wavelength-offset polarization-division multiplexing labeling. More particularly, the present invention relates to an optical packet communication system using a wavelength-offset polarization-division multiplexing labeling, which maintains a wavelength interval between packet data and a label constant to reduce a beating noise, thereby preventing deterioration of performance of an optical signal.

2. Description of the Related Art

In an optical packet switching network, each node includes an ingress node, a core node, and an egress node, wherein a sending end is positioned at the ingress node and a receiving end is positioned at the egress node. An optical signal is generated at the ingress node, and directly transmitted to the egress node. Otherwise, the optical signal is generated at the ingress node, and is transmitted to the egress node through the core node.

In such an optical packet switching network, packet data are transmitted together with a label. The label indicates information with respect to a moving direction of the packet data. How to assign the label is called a labeling. A labeled optical signal is generated at the ingress node and is transmitted to the core node. A label swapping device positioned at the core node determines a destination node of the optical signal, and transmits the optical signal to the determined node. A label swapping is an operation that substitutes a previous label by a new label at a core node that has received an optical signal from an ingress node, wherein the new label includes next moving direction information of the optical signal.

There are a time-division multiplexing (TDM) labeling, a wavelength-division multiplexing (WDM) labeling, an optical-code-division multiplexing (OCDM) labeling, a sub-carrier multiplexing (SCM) labeling, and an orthogonal optical labeling as examples of a labeling.

FIG. 1 is a view for illustrating a sub-carrier multiplexing labeling. With reference to FIG. 1, the sub-carrier multiplexing labeling has packet data containing information in the respective wavelengths λn (where, n is a natural number). A label is loaded at a position away from the respective waves by $\pm f_c$ in a sub-carrier, and is transmitted with packet data. In such a sub-carrier multiplexing labeling, a label swapping device is very complicated, and it is thus difficult to embody the label swapping device.

Wavelength-division multiplexing is a technology that multiplexes and transmits optical channels having different wavelengths through one optical fiber. A wavelength-division multiplexing labeling transmits packet data at odd-numbered wavelengths $\lambda_{2m+1}$ (m is a positive integer number), and loads and transmits a label at even-numbered wavelengths $\lambda_{2m}$ (m is a positive integer number). As discussed previously, since the wave-division multiplexing labeling loads and transmits label information at a wavelength different from that of the packet data, it requires an additional optical channel for labeling.

In accordance with a time-division multiplexing labeling, a label is assigned and transmitted between a first bit of packet data and an eighth bit of packet data. Accordingly, unlike the wave-division multiplexing labeling or the sub-carrier multiplexing labeling, in the time-division multiplexing labeling, in order to obtain label information, the packet data should be processed. This causes a label swapping process to be complicated.

SUMMARY OF THE INVENTION

Accordingly, it is an aspect of the present invention to provide an optical packet communication system for performing a stable labeling at a low cost using a wavelength-offset polarization-division multiplexing labeling.

Another aspect of the present invention is to provide an optical packet communication system, which reduces an occurrence of a beating noise due to a polarization mode division or a polarization dependence loss in order to prevent an optical signal from being deteriorated using a wavelength-offset polarization-division multiplexing labeling.

The above aspect of the present invention is substantially realized by providing an optical communication system using a labeling of a wavelength-offset polarization-division multiplexing, comprising: an optical signal transmitter provided at an ingress node positioned at a sending end in an optical packet switching network, for generating and combining packet data and a label, and for transmitting the combined packet data and label to a core node, wherein the packet data and label have polarization directions perpendicular to each other and maintain a predetermined wavelength interval; and a label swapping device for detecting the label from the combined packet data and label received from the optical signal transmitter, for detecting next moving position information of the packet data, for generating a new label, for substituting the detected label by the new label, for combining the new label with the packet data, and for transmitting the combined packet data and new label to a next moving position.

Preferably, but not necessarily, the optical signal transmitter may include: packet and label generators for generating packet data and a label using a plurality of lasers having different oscillation wavelengths, respectively, wherein the packet data and the label maintain a predetermined wavelength interval and have polarization directions perpendicular to each other; and a polarization beam combiner for combining the packet data and the label generated by the packet and label generators, respectively, and transmitting the combined packet data and label.

More preferably, but not necessarily, the predetermined wavelength interval may be from 12 GHz to 20 GHz, when a transmission speed of the packet data is 10 Gb/s.

Most preferably, but not necessarily, as the packet data and the label maintain the predetermined wavelength, an occurrence of a beating noise due to a polarization mode division or a polarization dependence loss may be reduced.

In an embodiment, the label swapping device may include: a label detector for detecting a label from the optical signal to obtain next position information of the optical signal, and controlling an optical switch to move the packet data to a position recorded in the label based upon the obtained next position information; a second label generator for generating a second label; and a second polarization beam combiner for combining the packet data and the second label, and transmitting the combined packet data and second label.

In an embodiment, the label detector may include: a polarization adjusting section for adjusting a polarization of the optical signal from the optical signal transmitter; a polarization beam splitter for dividing the optical signal from the polarization adjusting section into vertical and horizontal polarization components; a packet detector for receiving the packet data from the polarization beam splitter; a label detecting section for obtaining next moving information of the optical signal based on the label from the polarization beam splitter; and a node controller for controlling an optical switch to move the packet data to a position recorded in the label based on the next moving information of the optical signal detected by the label detecting section.

In an embodiment, the polarization beam splitter may be constituted by the same element as that of the polarization beam combiner.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

The present invention will now be described with reference to the accompanying drawings, in which exemplary embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements.

Figure 1:
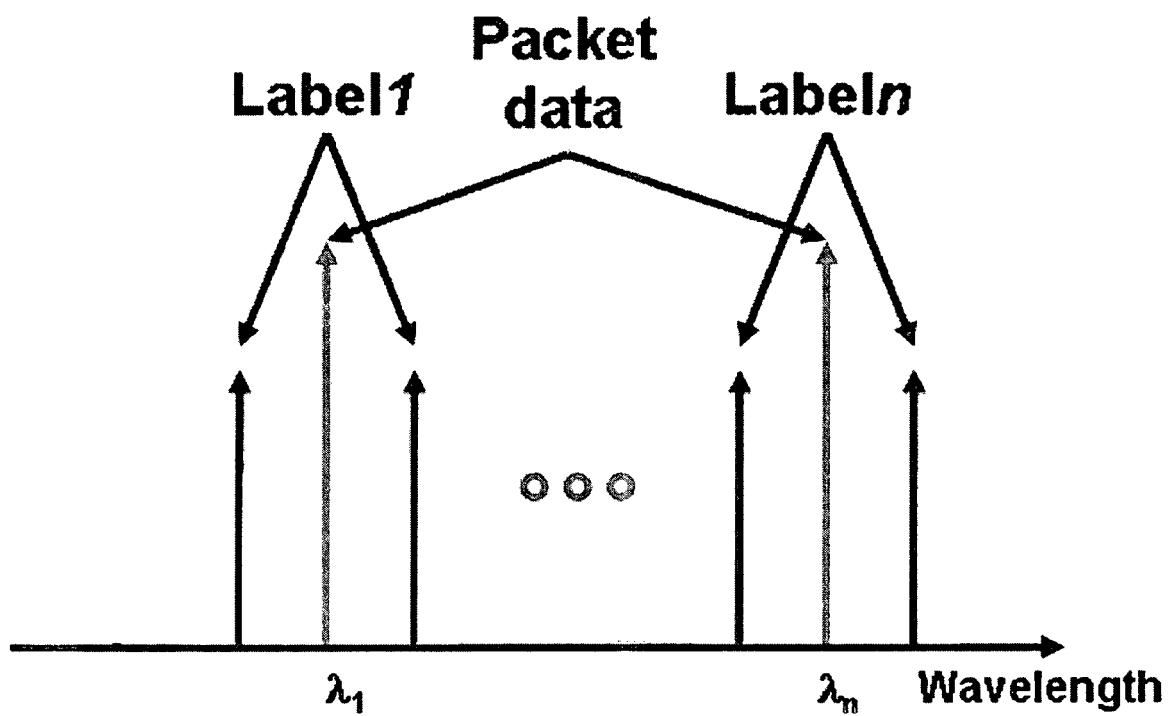
FIG. 1 is a view for illustrating a labeling of a sub-carrier multiplexing.
Figure 2:
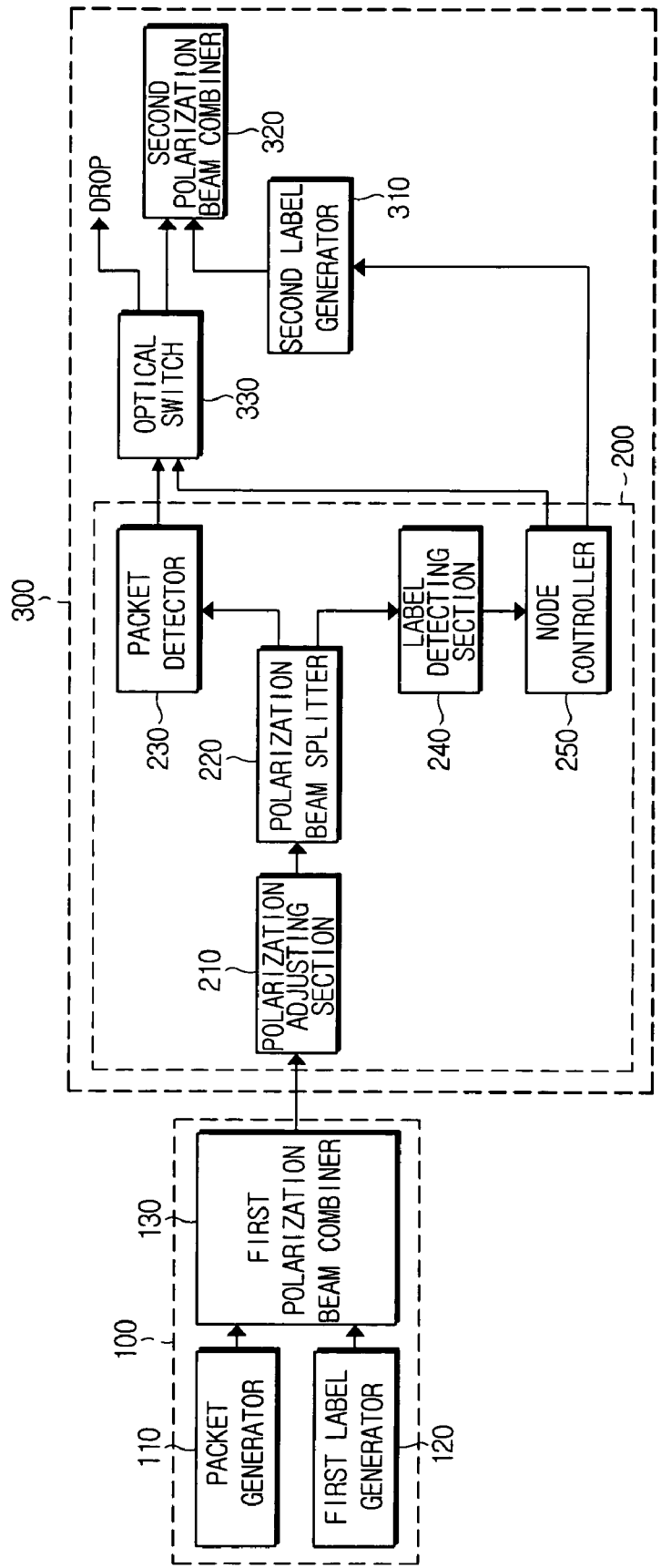
FIG. 2 is a block diagram showing a configuration of an optical packet communication system using a wavelength-offset polarization-division multiplexing labeling in accordance with an embodiment of the present invention.

FIG. 2 is a block diagram showing a configuration of an optical packet communication system using a wavelength-offset polarization-division multiplexing labeling in accordance with an embodiment of the present invention. Referring to FIG. 2, the optical packet communication system using a wavelength-offset polarization-division multiplexing labeling in accordance with an embodiment of the present invention includes an optical signal transmitter 100 and a label swapping device 300.

The optical signal transmitter 100 is provided at an ingress node in an optical packet switching network. A sending end is positioned at the ingress node. The optical signal transmitter 100 includes a packet generator 110, a first label generator 120, and a first polarization beam combiner 130. Each of the packet generator 110 and the first label generator 120 includes a laser as an optical source. Unlike a conventional polarization-division multiplexing, a preferred embodiment of the present invention shifts a wavelength of a label using lasers having different oscillation wavelengths.

The packet generator 110 generates packet data the polarization of which is polarized in an X axis. The first label generator 120 generates a label polarized in a direction perpendicular to the polarization direction of the packet data, and outputs the generated label to the first polarization beam combiner 130. The first polarization beam combiner 130 combines the generated packet data from the packet generator 110 and the generated label from the first label generator 120, and transmits the combined packet data and label. After the combination, the polarizations of the combined packet data and label continue to be maintained.

An optical signal combined by the first polarization beam combiner 130 includes packet data and a label. In the aforementioned manner, the labeled optical signal is transmitted from the optical signal transmitter 100 of the ingress node to a core node.

When the optical signal is transmitted from the ingress node to a first core node, the label swapping device 300 positioned at a core node detects the label from the optical signal, and detects next moving position information of the packet data based on the detected label. Thereafter, the label swapping device 300 generates a new label having moving position information of the packet data, and substitutes the detected label by the new label. Next, the label swapping device 300 combines the packet data and the new label, and transmits the combined packet data and new label to a detected new moving position.

The label swapping device 300 includes a label detector 200, a second label generator 310, and a second polarization beam combiner 320. The label detector 200 includes a polarization adjusting section 210, a polarization beam splitter 220, a packet detector 230, a label detecting section 240, and a node controller 250. The polarization beam splitter 220 is constituted by the same element as that of the first polarization beam combiner 130 or the second polarization beam combiner 320 described above.

The polarization adjusting section 210 adjusts a polarization of the optical signal from the optical signal transmitter 100, and outputs the optical signal having the adjusted polarization to the polarization beam splitter 220. The polarization beam splitter 220 separates the optical signal from the polarization adjusting section 210 into a vertical polarization component and a horizontal polarization component. At this time, when the vertical polarization component is the packet data, the horizontal polarization becomes the label. In addition, when the vertical polarization component is the label, the horizontal polarization becomes the packet data. The packet detector 230 and the label detecting section 240 receive the packet data and the label from the polarization beam splitter 220, respectively.

The label detecting section 240 obtains position information of a node to which the optical signal will be moved next, based on the received label, and outputs the obtained position information of the node to the node controller 250. The node controller 250 controls the optical switch 330 to move the packet data to a node position recorded in the label based upon the obtained position information of the node. The packet detector 230 detects the packet data and outputs the detected packet data to the second polarization beam combiner 320. Also, the node controller 250 provides the position information obtained by the label detecting section 240 to the second label generator 310.

On the other hand, the second label generator 310 of the label swapping device 300 generates a new label having the position information about the next moving direction of the optical signal provided from the node controller 250, and provides the generated label to the second polarization beam combiner 320. The packet data outputted to the second polarization beam combiner 320 and the generated label maintain different wavelength intervals from each other. Polarization directions of the packet data and the label are perpendicular to each other.

In the same manner as the first polarization beam combiner 130, the second polarization beam combiner 320 combines the packet data and the label being orthogonal polarized components, and transmits the combined packet data and label to the next moving node obtained by the label detecting section 240. In such a way, the packet data is transmitted to a final egress node via a plurality of core nodes.

Figure 3:
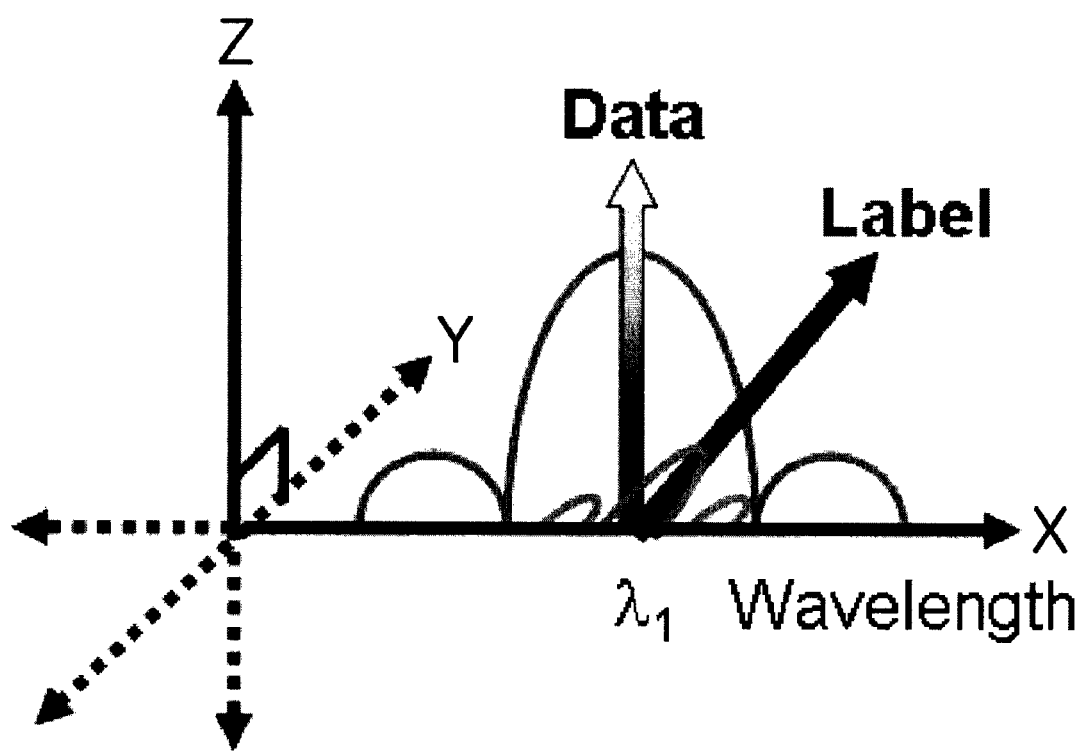
FIG. 3 is a view showing packet data and a label to be processed in a conventional polarization-division multiplexing labeling.

FIG. 3 is a view showing packet data and a label to be processed in a conventional polarization-division multiplexing labeling. In FIG. 3, a moving direction of the optical signal is set as an X axis, a polarization direction of the label is set as a Y axis, and a polarization direction of the packet data is set as a Z axis. A polarization-division multiplexing labeling generates packet data and a label having polarizations perpendicular to each other at the same wavelength using lasers having the same oscillation wavelength, and simultaneously transmits the generated packet data and label. The polarization-division multiplexing labeling is widely used in optical communication.

However, when the polarization-division multiplexing labeling is applied to an optical packet switching network, a polarization mode dispersion and a polarization dependence loss occur due to characteristics of an optical fiber. This causes orthogonal polarization to break down, thereby causing a single polarization phenomenon, wherein the packet data and the label become united.

Due to the single polarization phenomenon, an optical beating occurs between the packet data and the label. A beating noise occurs due to the optical beating, causing deterioration of the optical signal. The optical beating is a kind of interference phenomena.

Figure 4A:
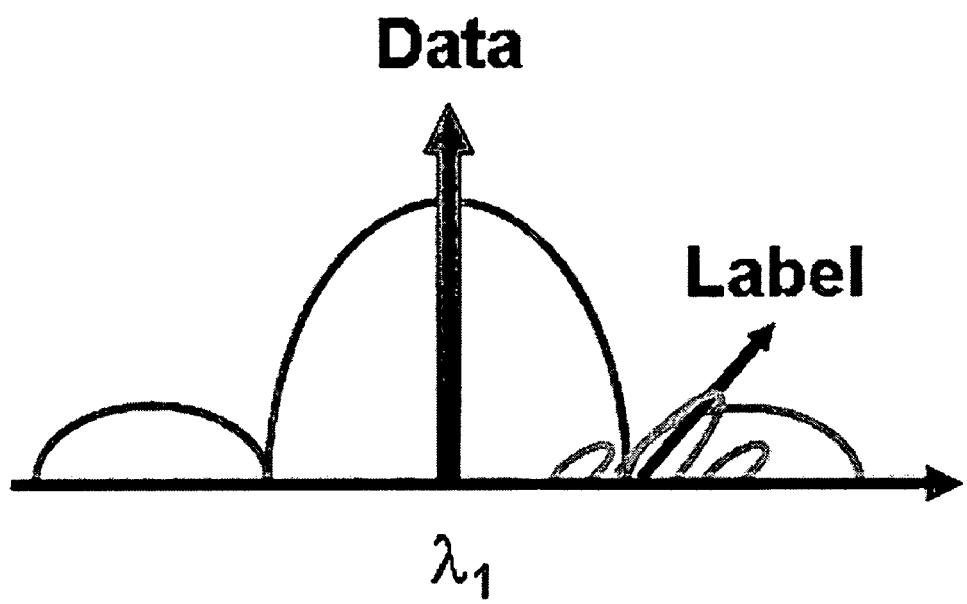
FIG. 4A is a view showing packet data and a label to be processed in a wavelength-offset polarization-division multiplexing labeling in accordance with an embodiment of the present invention.

FIG. 4A is a view showing packet data and a label to be processed in a wavelength-offset polarization-division multiplexing labeling in accordance with an embodiment of the present invention. With reference to FIG. 4A, lasers having different wavelengths generate the packet data and the label, respectively. Accordingly, the packet data and the label are generated to maintain a predetermined wavelength and have polarization directions perpendicular to each other. At this time, when a transmission speed of the packet data is 10 Gb/s, it is preferred that the wavelength interval of the packet data and the label is from 12 GHz to 20 GHz.

Figure 4B:
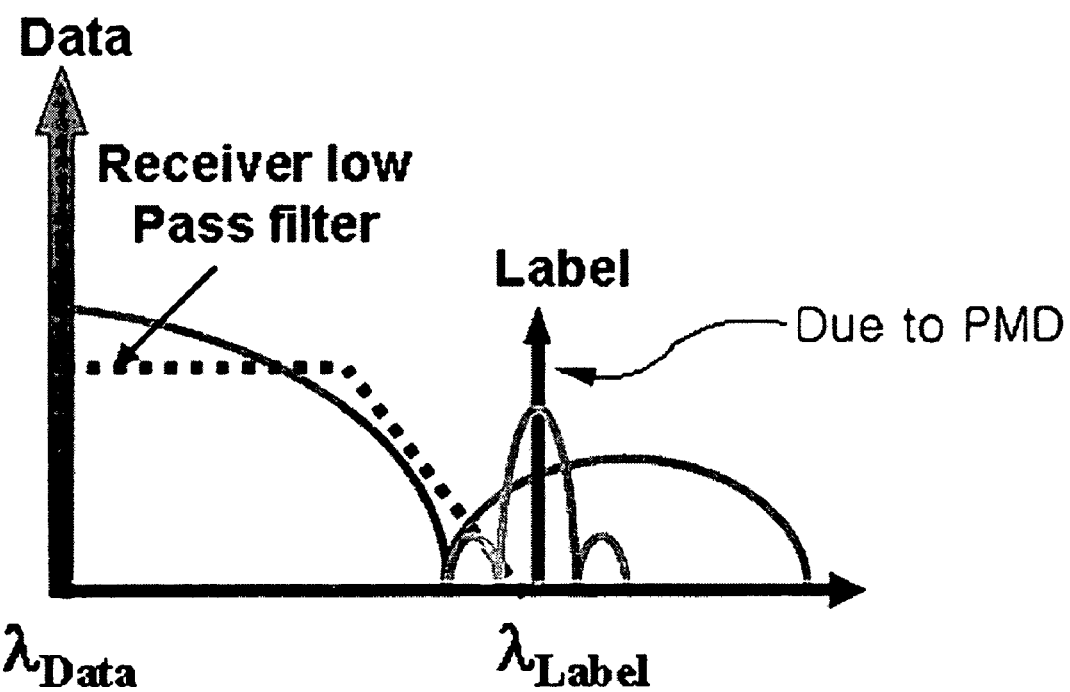
FIG. 4B is a view illustrating that an occurrence of a beating noise is reduced when the packet data and the label maintain a constant wavelength interval.

FIG. 4B is a view illustrating that an occurrence of a beating noise is reduced when the packet data and the label maintain a constant wavelength interval. Referring to FIG. 4B, when the label detector 200 separates the optical signal into the packet data and the label, a receiver of the packet data filters a beating noise occurring due to a polarization mode dispersion or a polarization dependence loss by a low pass filter in order to prevent the performance of the packet data from being deteriorated.

Figure 5:
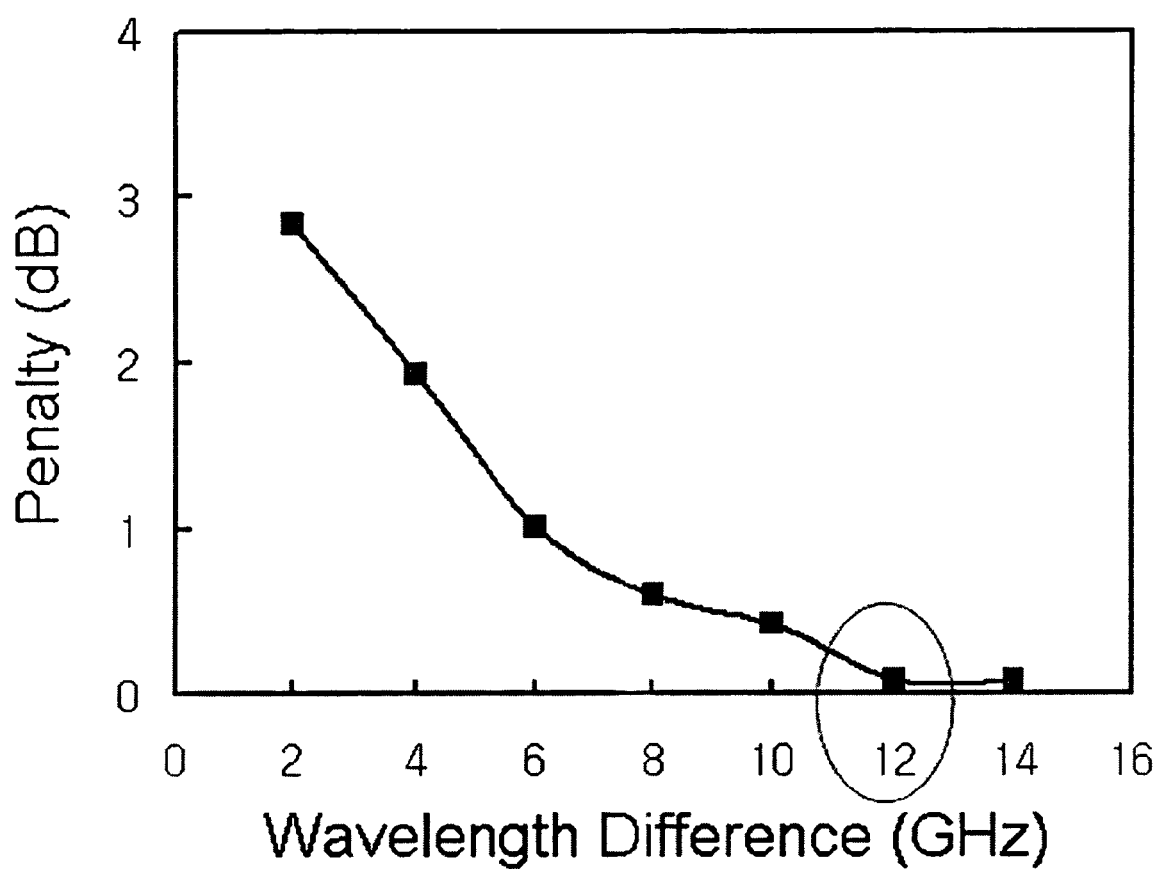
FIG. 5 is a view showing a size of a beating noise component according to a wavelength interval of the packet data and the label.

FIG. 5 is a view showing the size of a beating noise component according to a wavelength interval of the packet data and the label. With reference to FIG. 5, when the wavelength interval of the packet data and the label is widened to, or more than 12 GHz, it is understood that a beating noise component is minimized.

As described above, consistent with the present invention, a beating noise occurring due to a polarization mode dispersion or a polarization dependence loss may be reduced. Furthermore, the present invention can stably transmit packet data and a label at a low cost.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An optical communication system using a labeling of a wavelength-offset polarization-division multiplexing, comprising:

an optical signal transmitter provided at an ingress node positioned at a sending end in an optical packet switching network, which generates and combines packet data and a label, and transmits an optical signal including the combined packet data and label to a core node, wherein the transmitted packet data and label have polarization directions perpendicular to each other and maintain a predetermined wavelength interval; and a label swapping device that detects the label from the combined packet data and label received from the optical signal transmitter, adjusts a polarization of the optical signal from the optical signal transmitter, detects next moving position information of the packet data, generates a new label, substitutes the detected label by the new label, combines the new label with the packet data, and transmits the combined packet data and new label to a next moving position, wherein the predetermined wavelength interval is from 12 GHz to 20 GHz, when a transmission speed of the packet data is 10 Gb/s.

2. The system as claimed in claim 1, wherein if a beating noise occurs due to a polarization mode dispersion or a polarization dependence loss, as the packet data and the label maintain the predetermined wavelength interval, the beating noise is reduced.

3. An optical communication system using a labeling of a wavelength-offset polarization-division multiplexing, comprising:

an optical signal transmitter provided at an ingress node positioned at a sending end in an optical packet switching network, which generates and combines packet data and a label, and transmits an optical signal including the combined packet data and label to a core node, wherein the transmitted packet data and label have polarization directions perpendicular to each other and maintain a predetermined wavelength interval; and a label swapping device that detects the label from the combined packet data and label received from the optical signal transmitter, adjusts a polarization of the optical signal from the optical signal transmitter, detects next moving position information of the packet data, generates a new label, substitutes the detected label by the new label, combines the new label with the packet data, and transmits the combined packet data and new label to a next moving position, wherein the label swapping device comprises:

a label detector that detects a label from the optical signal to obtain next moving information of the optical signal, and controls an optical switch to move the packet data to a position recorded in the label based upon the obtained next moving information;

a label generator that generates the new label; and a polarization beam combiner that combines the packet data and the new label, and transmits the combined packet data and new label; and wherein the label detector comprises:

a polarization adjusting section that adjusts the polarization of the optical signal from the optical signal transmitter;

a polarization beam splitter that divides the optical signal from the polarization adjusting section into vertical and horizontal polarization components;

a packet detector that receives the packet data from the polarization beam splitter;

a label detecting section that obtains next moving information of the optical signal based on the label from the polarization beam splitter; and a node controller that controls the optical switch to move the packet data to a position recorded in the label based on the next moving information of the optical signal detected by the label detecting section.

4. The system as claimed in claim 3, wherein the polarization beam splitter is constituted by a same element type as that of the polarization beam combiner.

* * * * *